Figure 1:
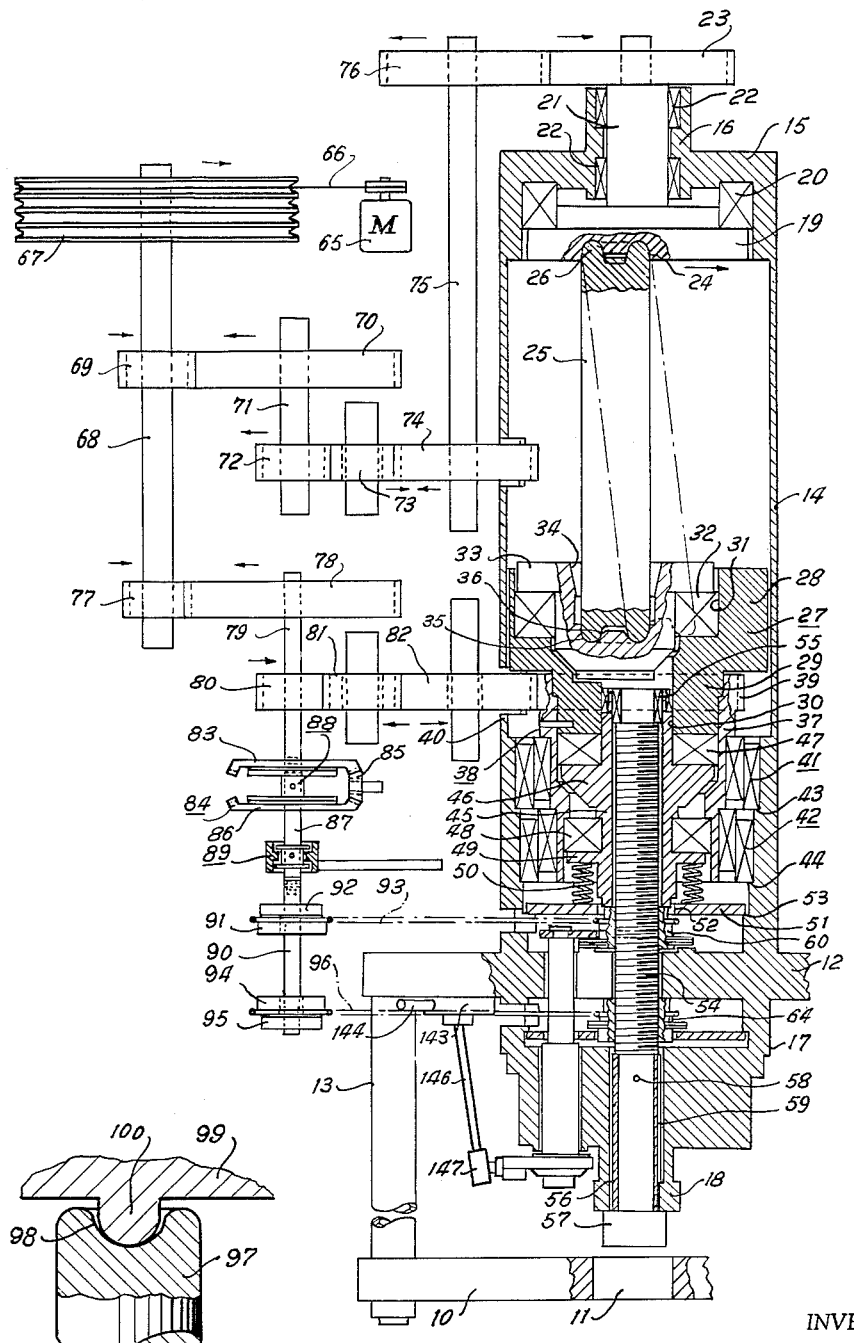

April 5, 1966   J. D. HAMAKER   3,244,014
MECHANICAL THRUST TRANSMITTING DEVICES
Filed Aug. 23, 1963   5 Sheets-Sheet 1

INVENTOR
John D. Hamaker
BY Ashley & Ashley
ATTORNEYS

INVENTOR
John D. Hamaker
BY *Shley & Shley*
ATTORNEYS

April 5, 1966  J. D. HAMAKER  3,244,014
MECHANICAL THRUST TRANSMITTING DEVICES
Filed Aug. 23, 1963  5 Sheets-Sheet 3

INVENTOR
John D. Hamaker

BY *Shley & Shley*
ATTORNEYS

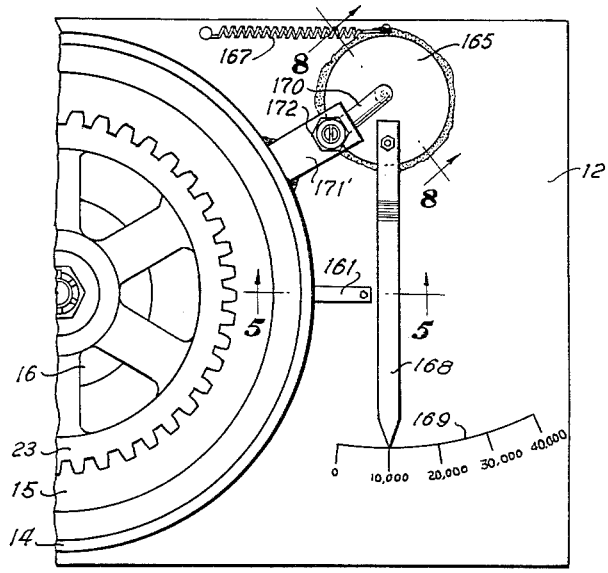

United States Patent Office 3,244,014
Patented Apr. 5, 1966

3,244,014
MECHANICAL THRUST TRANSMITTING DEVICES
John D. Hamaker, Rte. 7, Box 276, Tyler, Tex.
Filed Aug. 23, 1963, Ser. No. 304,036
2 Claims. (Cl. 74—44)

This invention relates to new and useful improvements in mechanical thrust transmitting devices.

A principal object of the invention is to provide an improved mechanical thrust transmitting device utilizing a wobbly pin for the transmittal of thrusts of large magnitude with a relatively low powered input and with greatly reduced friction losses.

Another principal object of the invention is to provide an improved mechanical thrust transmitting device by means of which thrust movements of very small amplitude may be transmitted and accumulated to provide thrust of considerable force transmitted through appreciable strokes.

Still another principal object of the invention is to provide an improved mechanical thrust transmitting device utilizing a wobbly pin to provide thrust forces of large magnitude from relatively low power inputs through a travel path of very small amplitude, and for accumulating such thrusts of small amplitude to provide power thrust of large magnitude transmitted through relatively large paths of movement.

Yet another object of the invention is to provide an improved mechanical thrust transmitting device utilizing a pair of heads having a wobbly pin extending therebetween, the wobbly pin engaging the heads eccentrically, at least one of the heads being rotatable, and at least one of the heads being movable longitudinally in response to thrusts delivered by the wobbly pin.

Still a further object of the invention is to provide an improved mechanical thrust transmitting device in which an elongate screwthreaded shaft carrying a driving nut and a holding nut having slippable driving connections receives relatively large thrusts through relatively small incremental longitudinal movements, the driving nut functioning to transmit the longitudinal movement to the elongate screw and the holding nut functioning to retain such movement to permit a cumulative longitudinal movement of relatively large amplitude to deliver thrust forces of large magnitude.

Another object of the invention is to provide an improved mechanical thrust transmitting device having therein a novel and unique mechanism for indicating the magnitude of the thrust being delivered.

Still another object of the invention is to provide an improved mechanical thrust transmitting device having means for readily adjusting the length of travel of any single thrust movement.

Yet another object of the invention is to provide an improved mechanical thrust transmitting device having means for varying over a wide range the number of thrust movements per unit of time, and thus the magnitude of the force delivered by each thrust movement.

An additional object of the invention is to provide an improved mechanical thrust transmitting device having unique means for obtaining rotational movement from a reciprocating power input with very low friction loss, and particularly a relatively high speed rotational output from a relatively low speed reciprocating power input of relatively small amplitude of movement.

Other and more particular objects of the invention will be apparent from a reading of the following description.

A construction designed to carry out the invention will be hereinafter described, together with other features of the invention.

Figure 2:
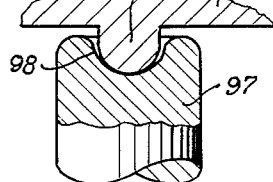
Figure 3:
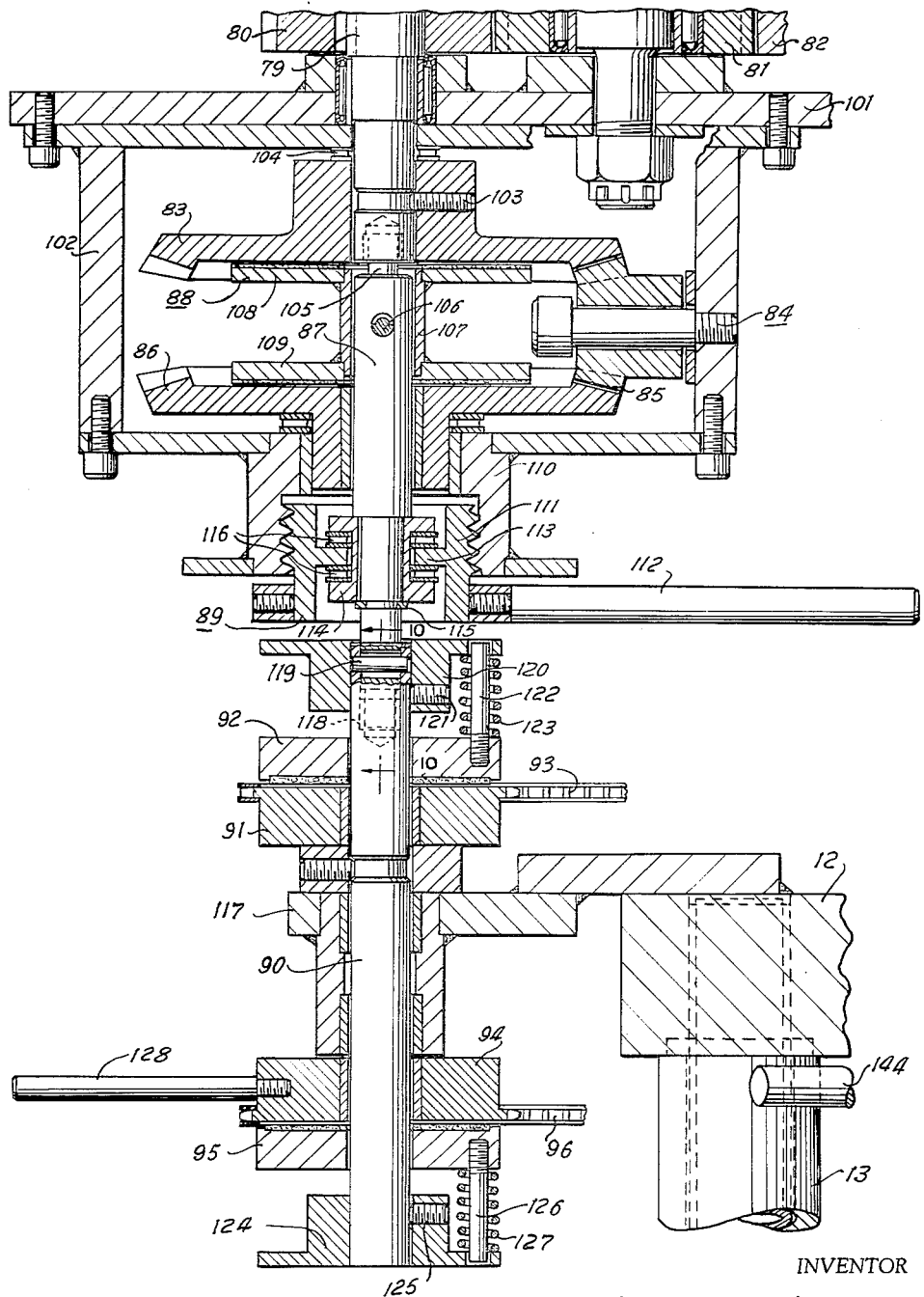
Figure 4:
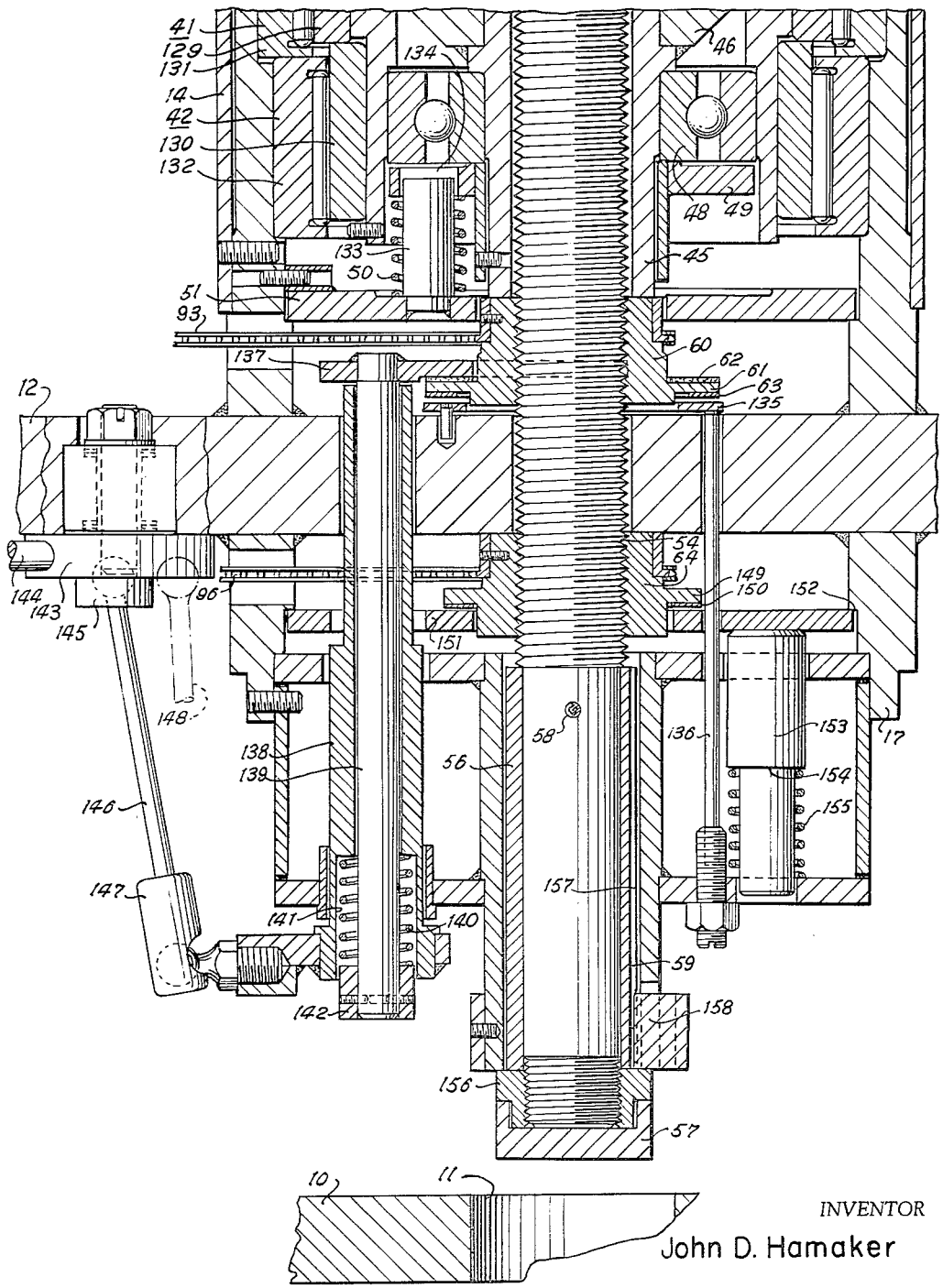
Figure 9:
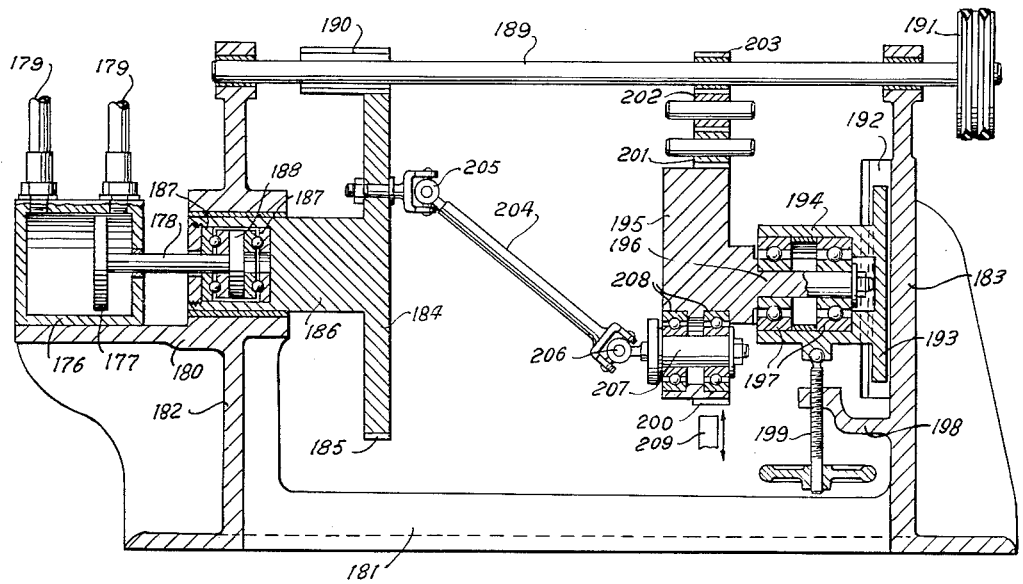
Figure 10:
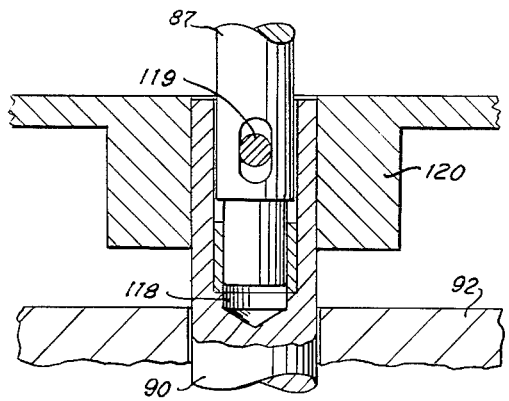

The invention will be more readily understood from a reading of the following specification and by reference to the accompanying drawings, wherein examples of the invention are shown, and wherein:

FIG. 1 is a diagrammatic view, partly in elevation and partly in section, illustrating a mechanical thrust transmitting device constructed in accordance with this invention, FIG. 2 is an enlarged, fragmentary view of an alternate mode of engagement between the wobbly pin and the heads, FIG. 3, is an enlarged, vertical, sectional view of the driving mechanism for the driving and holding nuts, FIG. 4 is an enlarged, vertical, sectional view of the inching screw mechanism, FIG. 5 is an enlarged, vertical, sectional view of one margin of the upper head, FIG. 6 is a plan view illustrating the load indicating mechanism, FIG. 7 is a vertical, fragmentary view in elevation of the load indicating mechanism, FIG. 8 is a vertical, fragmentary, cross-sectional view of the lower portion of the load indicating mechanism, FIG. 9 is a vertical, longitudinal, sectional view of a modified form of the invention for converting reciprocal movement to rotary movement, and FIG. 10 is an enlarged sectional view taken on the line 10—10 of FIG. 3.

The mechanical thrust transmitting device of this invention involves primarily a pair of heads, each rotatable about an axis, and a wobbly pin engaging both heads eccentrically, the heads being revolved at differing rotational speeds relative to one another with one head being mounted for longitudinal movement for reception and transmittal of small amplitude thrust movements from the wobbly pin. The very large mechanical advantage involved between the driving means and the wobbly pin and resulting ultimately in the small longitudinal movements of one of the heads, permits a relatively small source of motive power to deliver effectively very large thrust forces acting through a very small path of movement.

The small, repetitious thrust movements of small amplitude but great force are made useable through an accumulating structure, designated as an inching screw, which includes an elongate screwthreaded pin or shaft surrounded by a sleeve-like member which receives the small reciprocal thrust movements of the movable head and is abutted at its lower end by a driving nut carried upon the screwthreaded member having a slippable driving means tending to revolve the nut and drive it upwardly or downwardly upon the screwthreaded member. A second holding nut is received upon the screwthreaded member and is adapted to abut the underside of a fixed frame member, the holding nut also having a slippable driving connection tending always to revolve the driving nut on the screwthreaded shaft and drive it either upwardly or downwardly thereon. When the screwthreaded member is being utilized to deliver a downward thrust, for example, as the longitudinally movable head is driven downwardly by the wobbly pin, such movement is delivered through the sleeve member to the driving nut and thence to the screwthreaded member causing the latter to move downwardly through a small increment of movement. At the lower end of the stroke, the holding nut will have moved upwardly against the frame member, preventing the screwthreaded shaft from returning to an upper position, and as the sleeve member is moved upwardly with the movable head, the driving nut will follow it upwardly so as to be in a position to receive the next increment of downward thrust. Thus, the screwthreaded rod or shaft is moved downwardly through very small increments, and such downward movement is held and retained to provide a large downward movement even though each incremental reciprocation is very small in amplitude. Both of the heads may be rotatable, or one may be fixed, but at least one of the heads must be rotatable and at least one of the heads must be mounted for longitudinal reciprocal movement. The relative speeds of rotation of the heads may be at any desired ratio, and the wobbly pin may have any desired degree of eccentricity of engagement with either or both of the heads but must engage both heads eccentrically. Desirably, the wobbly pin revolves with one of the heads, the other head having a portion revolving with the wobbly pin and a portion revolving at any desired speed. As noted, one of the heads may be rotatable, or may have means for holding it in a fixed position rotationwise.

Turning now to a more detailed description of an embodiment of the invention, reference is made to FIG. 1 of the drawings wherein the numeral 10 designates a lower transverse frame member adapted to receive a female die member or other workpiece in a central aperture 11, and being connected to an upper transverse frame member 12 by upstanding posts 13. A tubular or cylindrical shell or housing 14 extends upwardly from the transverse frame member 12, terminating at its upper end in a cap 15 having a central, apertured neck 16. The housing 14 is formed with various internal, annular shoulders as will be described further hereinafter, and a somewhat shorter, axially-alined housing 17 extends downwardly from the frame member 12, being also provided with a central, depending, apertured collar 18.

An upper head 19 is rotatably mounted in the cap 15 upon a suitable bearing or bearings 20, preferably a thrust bearing, and carries an upstanding stub shaft 21 extending upwardly through the neck 16 and rotatably positioned therein by suitable bearings 22. A gear wheel 23 is secured to the upper end of the stub shaft 21.

In the lower surface of the head 19, there is formed a circular groove 24, having a transverse cross-section semi-circular in shape, and being positioned eccentrically with respect to the axis of rotation of the head 19. An elongate wobbly pin 25 carries on its upper end a circular rib 26, also semi-circular in transverse cross-section, or generally, in the shape of one-half of a toroid so as to be complementary in size and shape to the groove 24. The rib 26 is received in the groove 24 and is free to rock therein about its longitudinal axis, the pin 25 revolving with the head 19 so that there is no relative motion therebetween, but the rib 26 otherwise having a true rolling action in the groove 24 so as to present a minimum of frictional resistance as the wobbly pin 25 undergoes its wobbling or rocking action.

A lower head or head assembly 27 is disposed in the housing 14 below the upper head 19, and spaced therefrom by the wobbly pin 25, and includes an outer head member 28 having a depending axial neck 29 with an axial bore 30. An eccentric recess 31 is formed in the upper surface of the head member 28 and receives a thrust bearing 32 upon which a rotating socket member 33 is supported within the eccentric recess 31. The socket member 33 is formed with an axial socket 34 extending downwardly thereinto and having in its bottom a circular groove 35 receiving the circular rib 36 on the lower end of the wobbly pin 25 in substantially the same manner and relationship that the rib 26 at the upper end of the wobbly pin is received in the groove 24. Independent of the relative directions of rotation and the relative rotational speeds of the upper head 19 and the lower head assembly 27, which will be designated as the lower head, the socket member 33 will revolve with the wobbly pin 25, so that there may be relative rotational movement between the lower head member 28 and the socket member 33. Thus a rolling engagement occurs between both the upper and the lower ends of the wobbly pin 25 and their respective sockets. As will appear more fully hereinafter, the rotation, nonrotation, relative speeds of rotation and direction of rotation of the upper and lower heads may be varied over very wide ranges, as well as the length of the wobbly pin 25 and the eccentricity of the grooves 24 and 35, resulting in a wide variation of the number of impulse strokes per minute as well as the amplitude of such strokes. Assuming, however, a wobbly pin approximately 16 inches in length, an eccentricity of the upper groove 24 of $^{15}/_{16}$ of an inch with respect to the axis of the head 19, and an eccentricity of the bottom groove 35 of one inch with respect to the axis of the head assembly 27, a thrust stroke of approximately $\frac{1}{8}$ of an inch will be obtained.

The head member 28 carries on its downwardly-extending neck 29 an external gear sleeve 37 pinned to the member 28 at 38 so as to revolve therewith and carrying external gear teeth 39 in registry with a radial opening 40 cut in the side wall of the housing 14. Suitable upper and lower bearings 41 and 42 are disposed between the lower exterior of the gear sleeve 37 and the interior of the housing 14, the bearings resting upon suitable internal shoulders 43 and 44, respectively, in the housing and being of a type to permit limited longitudinal movement of the gear sleeve within the housing as the head member 28 and socket member 33 so move in the housing.

A thrust sleeve 45 is disposed within the gear sleeve 37 and has an upper, external, annular flange 46 with a thrust bearing 47 being disposed between the upper side of the flange 46 and the lower end of the neck 29 of the lower head assembly 27. A radially loaded bearing 47′ encircles the upper end of the thrust sleeve within the neck 29. Also, a radially loaded bearing 48 encircles the thrust sleeve 45 below the flange 46 and engages the inner periphery of the gear sleeve 37 so as to center the thrust sleeve rotationally within the gear sleeve. Below the bearing 48, the thrust sleeve carries a lower, external, annular flange 49, and a plurality of springs 50 are disposed between the underside of the flange 49 and a transverse plate 51 having a central aperture 52 and being supported upon an internal annular shoulder 53 within the lower portion of the housing 14. Thus, the springs 50 tend constantly to urge the thrust sleeve 45, and thus the gear sleeve 37 and the head assembly 27 upwardly within the housing 14, such upward movement being limited by the relative spacing between the upper head 19 and the lower head 27 at any given moment by reason of the position of the wobbly pin 25. An elongate screwthreaded rod or pin 54 telescopes the tubular thrust sleeve 45, having a guiding bushing or bearing 55 at its upper end slidably engaging the bore of the sleeve 45, and carrying on its lower end an elongate collar 56 extending downwardly through the collar 18 and having on its lower end a male die or other workpiece 57. The sleeve 56 is secured to the screw 54 by a set screw 58, and is held against rotation within the lower housing 17 by means of an elongate spline 59 provided between the sleeve or collar 56 and the bore of the lower housing.

A driving or feeding nut 60 having external sprocket teeth, is in screwthreaded engagement with the screw 54 immediately below the lower end of the thrust sleeve 45 and is adapted to be engaged by the thrust sleeve for forcing the screw 54 downwardly. As shown more clearly in FIG. 4, the nut 60 has an external outwardly projecting flange 61 on its lower end with a friction member 62 and an anti-galling face 63 on its upper and lower faces, respectively.

Below the upper transverse frame member 12, a holding nut 64, similar to the nut 60 and having external sprocket teeth, is received in screwthreaded relationship upon the screw 54 and is adapted through rotary movement to screw upwardly upon the screw 54, engaging the underside of the frame member 12 and limiting upward movement of the screw 54 within the thrust sleeve 45.

For driving the upper and lower heads 19 and 27 as well as the driving nut 60 and the holding nut 64 any suitable prime mover or source of rotative motion may be employed, such as, for a thrust mechanism producing ⅛ inch long, twenty-ton power strokes for ½ minute (½ minute idle) and neglecting friction and flywheel effect, a ⅓ horsepower electric motor will deliver twelve power strokes per minute.

The motor, or other driving means 65 is operatively connected, as by a belt 66 to a multiple groove pulley 67 carried upon a shaft 68. Desirably, the driving means will be provided with a step cone pulley so that the pulley 67 and shaft 68 may be driven at various selective speeds. A gear wheel 69 mounted on the shaft 68 drives a gear wheel 70 mounted on a shaft 71 carrying a second gear 72 which drives a gear 73, the latter, in turn driving a gear 74 carried upon a shaft 75. A gear wheel 76 mounted on the upper end of the shaft 75 meshes with the gear wheel 23 to drive the upper head 19.

The gear wheel assembly and shaft 71 are mounted for movement in a horizontal arc, and accordingly, the gear 70 may be replaced with other gears having a different tooth count to increase or decrease the speed of rotation of the head 19, and accordingly, increase or decrease the number of thrust impulses per minute. In this manner, the number of thrust strokes per minute may be varied from a relatively few to quite a few hundred strokes per minute.

The shaft 68 also carries a gear wheel 77 meshing with a gear wheel 78 revolving a shaft 79 upon which is mounted a gear wheel 80 meshing with a gear wheel 81 which, in turn, meshes with a gear wheel 82. The periphery of the gear wheel 82 extends through the opening 40 into engagement with the gear teeth 39 of the gear sleeve 37 so that the lower head assembly 27 is driven simultaneously with the upper head 19, but either at a different speed or in a different direction of rotation. In the particular arrangement shown in FIG. 1, the upper and lower heads are being rotated in the same direction at different speeds.

The gear wheel 70 may be completely disengaged from the gear wheel 69 so as to break the driving train to the upper head 19, and as will appear more fully hereinafter, suitable stop means may be utilized for holding the upper head 19 against revolution so that only the lower head 27 is being driven. Of course, the meshing of the teeth of the gear 82 with the gear teeth 39 of the gear sleeve 37 permits the latter to undergo limited vertical reciprocation without the loss of the driving function.

The shaft 79 is extended beyond the gear wheel 80 and drives a first miter gear 83 of a reversing mechanism designated generally as the numeral 84, the miter gear 83 driving a reversing gear 85 which, in turn, drives a second miter gear 86 axially alined with the first miter gear 83 but turning in the opposite direction. An intermediate floating shaft 87 is axially alined with the shaft 79 but is freely rotatable with respect thereto as well as being free to undergo limited longitudinal movement. The floating shaft 87 is driven by a double-faced clutch assembly 88 and is provided with a suitable mechanism 89 for shifting the shaft 87 longitudinally and bringing the clutch assembly 88 into engagement with either the miter gear 83 or the miter gear 86 so as to drive the shaft 87 selectively in either direction.

A shaft 90 is axially alined with the shaft 87 and driven thereby, but the shaft 87 is also free to undergo limited longitudinal movement with respect to the shaft 90. The latter carries a first sprocket gear wheel 91 driven from the shaft 90 through a slippable driving connection 92 and driving a sprocket gear chain 93 which, in turn, operates the driving nut 60. A second sprocket gear wheel 94 is also mounted on the shaft 90 and driven therefrom through a slippable driving connection 95. The sprocket gear wheel 94 drives a sprocket gear chain 96 which drives the holding nut 64. Thus, at all times the shaft 90 is being driven, torque is being transmitted to the driving nut 60 and the holding nut 64, but such torque is only of the order of magnitude that a resistance of a few pounds will cause the driving connections 92 and 95 to slip, so that the nuts may remain stationary when such is necessary to the operation of the inching screw arrangement.

As illustrated in FIG. 2, the structure whereby the ends of the wobbly pin engage the upper and lower head is subject to wide variation and may comprise a conventional ball and socket joint, a simple annular groove of rectangular cross-section receiving the flat end of a tubular wobbly pin, or may be the arrangement shown in FIG. 2 wherein the wobbly pin 97 is provided with an axial pocket 98 in its end, and the head 99 which may be either the upper or lower head or both, carries a hemispherical protuberance 100 received in the socket 98. The type of end portion for the wobbly pin and the groove for reception thereof as shown in FIG. 1 is the preferred construction, however.

A more detailed illustration of the driving structure for the driving or feeding nut 60 and the holding nut 64, together with the reversing mechanism therefor, is shown in FIG. 3 wherein a transverse plate 101 carried and supported by the housing 14 in any suitable or desirable fashion has mounted on its underside a gear box 102 into which the shaft 79 extends and within the miter gears 83, 85 and 86 are rotatably mounted. The first miter gear is suitably held on the shaft 79 by a set screw 103 and spaced from the upper wall of the gear box 102 by an antifriction bearing 104. The floating shaft 87 has a reduced bearing pin 105 rotataby supported in the lower end of the shaft 79 and has secured thereto by a set screw 106 a collar 107 carrying the upper clutch or friction disk 108, adapted to engage the underside of the miter gear 83, and the lower clutch or friction disk 109 adapted to engage the upper side of the miter gear 86. Obviously, by selective longitudinal shifting of the shaft 87 either of the clutch disks may be brought into engagement with its respective miter gear to drive the shaft 87 in one direction or the other.

The gear box carries a depending axial collar 110 internally screwthreaded at its lower end and receiving a screwthreaded sleeve 111 having a rotating handle 112 projecting laterally therefrom. The sleeve 111 has an internal, inwardly projecting, annular flange 113 engaging within a spool 114 held upon the shaft 87 by a snap ring 115, the flange 113 being spaced from the end flanges of the spool 114 by suitable antifriction bearings 116. Obviously, rotation of the sleeve 111 by the handle 112 in selected directions will cause the sleeve to move the spool 114, and thus the shaft 87, upwardly or downwardly to engage the disk 108 or the disk 109 for driving the shaft 87 in opposite directions.

The shaft 90 is suitably supported for rotation in a bracket and sleeve structure 117 secured upon the upper transverse frame member 12 and has at its upper end a bearing recess 118 within which the reduced lower end of the shaft 87 is longitudinally slidable, the latter being bifurcated and straddling a pin 119 extending across the upper end of the shaft 90 for transmitting rotational movement from the shaft 87 to the shaft 90 while permitting longitudinal movement of the shaft 87. A first pressure member 120 is locked upon the upper end of the shaft 90 by a set screw 121 and engages a driving pin 122 carried by the first pressure plate 92, a spring 123 constantly urging the pressure plate 92 against the sprocket gear wheel 91 so as to drive the latter and its related sprocket chain 93, but to permit slippage when the resistance to movement of the chain 93 reaches a level of some five to seven pounds. Similarly, on the lower end of the shaft 90 is provided a second pressure member 124 secured to the shaft by a set screw 125 and engaging a pin 126 extending from the second pressure plate 95, a second spring or set of springs 127 constantly urging the second pressure plate 95 against the second sprocket gear wheel 94 for driving the sprocket gear chain 96. Similarly, the spring 127 is set to permit slippage when the loading of the chain 96 reaches the level of five to seven pounds. Obviously, each or both the driving nut 60 and the holding nut 64 will be driven at all times in the desired direction until such time as the loading of either or both the chains 93 and 96 reaches a level of five to seven pounds, at which time the friction plates 92 and 95 will be allowed to slip and the chains and their related driven nuts allowed to remain stationary without physical damage.

A short handle 128 extends from the sprocket gear wheel 94 for manual grasping for purposes to be described hereinafter.

The inching screw structure, and especially the lower portions thereof are illustrated in further detail in FIG. 4 together with certain control and safety features important to the invention but not essential thereto. Thus, as shown in he upper end of FIG. 4, the bearings 41 and 42 may desirably be needle-type bearings in which the inner rings 129 and 130, respectively, are longitudinally slidable or slippable over the needle bearings carried in the outer raceways 131 and 132, respectively. Further, the arrangement of the return springs 50 may desirably comprise a plurality of guide pins 133 extending upwardly from the partition 51 within the springs 50 and being received in suitable guide openings 134 provided in the flange 49, the springs 50 acting in unison and exerting a total upward thrust against the flange 49 of several hundred or more pounds dependent upon the weight and inertia of the reciprocating head assembly.

As previously noted, the driving or feed nut 60 carries the external flange 61 with the upper friction face 62 and the lower anti-galling face 63, and a stop ring 135 desirably underlies the lower face 63, the vertical elevation of the stop ring 135 being determined by the plurality of vertically adjustable rods 136 extending downwardly through the housing 17 and being manually adjustable to position the ring 135 as a stop ring for the lower dead center point in the upward and downward stroke of the screwthreaded member 54.

For limiting the upward movement of the driving nut 60 and thus determining the length of each stroke of the screwthreaded member 54, a split yoke 137 straddles the nut 60 above the upper friction face 62 and rests upon the upper end of an elongate tubular sleeve 138 extending vertically through the housing 17 and projecting from the lower end thereof as well as upwardly through the upper frame member 12. A rod 139 telescopes the sleeve 138 and has its upper end rigidly secured to the yoke 137, there being a coiled compression spring 140 surrounding the lower end of the rod 139 and confined between the bottom of a counterbore 141 in the lower end of the sleeve 138 and a collar 142 carried on the lower end of the rod 139. With this arrangement, the spring 140 tends constantly to urge the rod 139 downwardly in the sleeve 138 and thus brings the yoke 137 into engagement with the upper end of the sleeve 138, yet permits upward movement of the yoke away from the upper end of the sleeve, as illustrated in FIG. 4, when occasion so demands. In some instances, an article being worked may display a strong tendency to spring back or move toward its original conformation as a deforming load is removed therefrom when the upper head begins its upper movement and prior to the time the lower nut 64 is moved into a holding position. If this occurs, damage may result to the flange 61, and the spring 140, by permitting the yoke 137 to move upwardly as required, guards against such damage.

For adjustably positioning the sleeve 138 vertically, a rotatable plate 143 having an operating handle 144 is mounted on the underside of the upper frame member 12 and carries an eccentric socket member 145 receiving the upper end of a small wobbly pin 146, the lower end of which is carried in a knuckle joint 147 projecting laterally from the lower end of the sleeve 138. Obviously, rotational adjustment of the plate 144 will swing the upper end of the pin 146 eccentrically around the center of the plate, causing the pin 146 to assume a more nearly vertical position, as indicated in dotted lines at 148, to move the sleeve 138 downwardly, or, when the plate 143 is revolved in the opposite direction, to move the sleeve 138 upwardly. Thus, the vertical elevation of the yoke 137 may be very minutely adjusted and very small thrust strokes up to strokes of a magnitude of ⅛ of an inch or so may be obtained.

It is also desirable to provide means for obtaining short repetition strokes without any cumulative downward travel, and for this purpose the nut 64 carries an external, outwardly projecting annular flange 149 having an anti-galling lower face 150 and overlying a transverse stop plate 151 extending horizontally across the interior of the housing 17 beneath a downwardly-facing annular shoulder 152 formed on the inner wall of said housing. A plurality of guide pins 153 extend upwardly in the housing 17 into engagement with the underside of the plate 151, the lower portions of the pins 153 being reduced in diameter to form downwardly-facing shoulders 154, springs 155 being confined between the shoulders 154 and the bottom wall of the housing 17 so as constantly to urge the pins 153 and the plate 151 upwardly, but permitting downward movement thereof under load. This structure may be utilized to cause the screw member 54 to deliver a continuous series of strokes without accumulating the downward strokes, thus facilitating such operations as hammering and riveting.

To obtain this function, the feed control yoke 137 is set in its off or downward position and the reversing mechanism 84 is placed in its neutral position so that the driving and holding nuts are not rotated. The handle 128 is then utilized to advance the holding nut onto its stop or pressure plate 151, compressing the springs 155, until the required length of stroke is obtained. At this point the holding nut will be carrying the screw member 54 and nut 60 upwardly by the spring-pressed plate 151, and the sleeve 45 will be driving the member 54 downwardly.

The spring loading of plate 151 also serves as a safety feature. If for any reason the holding nut fails to follow the driving nut up the screw, it can be forced down an eighth of an inch onto the pressure plate 151 without damage, and the feeding action stops.

In this more detailed illustration of FIG. 4, the sleeve 56 is confined upon the lower end of the screwthreaded member 54 by a nut 156 carried upon the lower end of the member 54, the latter, in turn, carrying the male die or other workpiece 57. The spline arrangement 59 comprises a longitudinal groove 157 in the outer wall of the sleeve 56 engaged by a spline or key member 158 surrounding the lower end of the apertured collar 18 and projecting inwardly therethrough into engagement with the groove 157 to hold the sleeve 56 and the screwthreaded member 54 against rotation.

Further refinements of the invention are shown in FIGS. 5–8, FIG. 5 illustrating the means for holding the upper head 19 against rotation when such is desired. In this structure, the head 19 is formed with a peripheral, longitudinal groove 159 at a selected circumferential position. A stiffening ring 160 is secured to the inner wall of the housing 14 radially outwardly of the head 19, and a locking pin 161 is adapted to be inserted through an opening 162 extending radially inwardly through the housing 14 and ring 160 into engagement with the groove 159 to lock the head 19 against rotation. A suitable tension spring 163 constantly urges the pin 161 inwardly to hold it in position. Of course, the head 19 may be provided with a number of the grooves 159 in selected positions if such is desired. When the head 19 is not to be locked into position, the pin 161 is merely withdrawn and allowed to hang free as illustrated in FIG. 7.

The structure is useful when the wobbly pin does not engage the upper and lower heads with the same eccentricity. Thus, by rotating the upper head to selected positions the stroke length or amplitude may be varied together with the magnitude of the thrust delivered.

It is also desirable to provide means for indicating the magnitude of the thrust being exerted by the mechanism, and for this purpose, a further modification of the wobbly pin is utilized and arranged to react to the vertical or longitudinal elongation of the housing 14 which will take place under load, the elongation corresponding, of course, to the thrust being exerted. This arrangement includes a supporting ring 164 secured upon the upper side of the upper frame member 12 and carrying a rotatable plate 165 upon a bearing 166. A tension spring 167 constantly urges the plate 165 to revolve in a counterclockwise direction as viewed in FIG. 6. An elongate, offset pointer arm 168 is secured to the plate or disk 165 and extends laterally therefrom over the upper surface of the frame member 12, the pointer being adapted to swing over a suitable scale 169 as shown in FIG. 6. The scale may be directly inscribed upon the upper surface of the frame member 12 or may be in the form of a separate scale member secured thereto.

An elongate wobbly pin 170 has its upper end engaging through a bearing ball 170' the lower end of a screwthreaded pin 171 mounted for longitudinal adjustment in a bracket arm 171' extending laterally from the upper end of the housing 14, the longitudinal adjustability of the wobbly pin 170 being retained by a lock nut 172 on the upper end of the pin positioned above the bracket arm 171'. The lower end of the wobbly pin 170 is chamfered or bevelled and carries a central socket 173 receiving a bearing ball 174, similar to the bearing ball 170', the lower portion of the bearing ball 174 being received in a recess 175 formed in the upper surface of the plate 165 eccentrically of the axis of rotation thereof. The wobbly pin 170 extends downwardly at an angle from the bracket arm 171' to the plate 165, and obviously, as the housing 14 elongates under load, the pin 170 will be moved slightly upwardly, permitting the spring 167 to revolve the plate 165, due to the eccentric engagement of the pin 170 therewith, and accordingly, swing the pointer 168 over the scale 169 to indicate the magnitude of the thrust being exerted.

In the operation of the mechanism, one of the heads 19 and 27 is held against rotation while the other rotates, both heads rotate but in opposite directions, or both heads rotate in the same direction but at differing speeds. As the mechanism functions, the wobbly pin necessarily causes the movable head to undergo reciprocal movement of small amplitude, which movement is transmitted to the thrust sleeve 45, causing the latter to be forced downwardly under the thrust developed by the wobbly pin 25, and to move upwardly under the influence of the springs 50 as the wobbly pin moves past bottom dead center and begins to approach top dead center.

Assuming the reversing mechanism 84 and 89 is set for downward travel of the inching screw 54, the driving nut 60 and holding nut 64 will be receiving a constant torque tending to revolve them in a direction to move them upwardly on the screwthreaded member 54, and consequently, the driving nut 60 will constantly be driven into engagement with the lower end of the thrust sleeve 45. Now, as the sleeve 45 is moved downwardly, the driving nut 60, being in engagement with the lower end thereof, will drive the screw member 54 downwardly, but at such time, the nut 60 will not be revolving upon the screw member due to its abutment with the sleeve 45, and consequently, its slippage mechanism 92 will be slipping with respect to its sprocket gear wheel 91. As the screw member 54 moves downwardly, however, the holding nut 64 is moved away from abutment against the underside of the frame member 12, freeing the holding nut 64 for revolution upon the screw member 54 so as to move upwardly and come again into abutment with the underside of the frame member 12. This action continues until the bottom dead center point of the stroke is reached at which time, the holding nut 64 will be in engagement with the underside of the frame member 12, preventing a return upward movement of the screw member. As the thrust sleeve 45 moves upwardly under the impetus of the springs 50, however, its lower end will be moved away from the driving nut 60, allowing the same to resume rotation and to follow the thrust sleeve 45 upwardly for reception of the next succeeding stroke. In this manner, the thrust sleeve 45 reciprocates through relatively small upward and downward strokes, the driving nut moving upwardly and downwardly with the thrust sleeve 45 but transmitting to the screwthreaded member 54 only the downward strokes. The holding nut 64 likewise moves upwardly and downwardly and functions at all times to prevent upward movement of the screwthreaded member 54 allowing only the downward movement thereof so that the screwthreaded member 54, along with the die or workpiece 57 is steadily moved downwardly in increments of small amplitude but under thrust forces of large magnitude. The amplitude of upward movement of the driving nut 60 is regulated through adjustment of the yoke member 137, and accordingly, the amplitude of each downward stroke is accordingly adjusted.

When the screwthreaded member 54 is to be retracted to an upper position, the reversing mechanism 84 and 89 is actuated to reverse the direction of rotation of the driving nut 60 and the holding nut 64, and through simple rotation of the two nuts, the screwthreaded shaft 54 is moved upwardly, the anti-galling faces 63 and 150 permitting the ready rotation of the nuts with respect to the stop ring 135 and stop plate 151.

In FIG. 9 is shown a modified form of the thrust transmitting mechanism particularly adapted for converting reciprocal motion to rotary motion, especially slow reciprocations of relatively short or small amplitude and large force magnitudes to relatively high speed rotation. This is a reverse movement to that previously described and is made possible largely because of the low friction characteristics of the wobbly pin.

Any suitable source of reciprocal movement may be employed such as a suitable float and inlet and outlet valve mechanism responsive to a rise and fall of a few inches from a river of large volumetric flow, a wave responsive float, or the like. In the embodiment shown in FIG. 9, a pressure cylinder 176 encloses a double acting piston 177 having a piston rod 178 extending from the cylinder, the latter having inlet and outlet conductors 179 provided with suitable valves (not shown) for admission and discharge of a pressure fluid to reciprocate the piston in the cylinder.

The cylinder 176 is carried upon a shelf or platform 180 extending horizontally from a basic supporting frame 181 having a vertical support member 182 disposed adjacent the platform 180 and a second vertical support member 183 parallel to but spaced longitudinally from the member 182. A first head 184, having peripheral gear teeth 185, is slidably and rotatably journaled in the support member 182 upon its hub 186, the latter having an axial recess receiving a pair of spaced thrust bearings 187. A thrust disk 188 is secured upon the exposed end of the piston rod 178 and confined between the bearings 187 so that axial reciprocation of the piston rod 178 by the piston 177 results in axial reciprocation of the first head 184, but the latter at the same time is permitted to rotate about its hub 186.

A shaft 189 is journaled in the upper portions of the support members 182 and 183 and carries an elongate gear 190 having a relatively small number of teeth, the gear 190 meshing with the gear teeth 185 on the first head 184. A power take-off pulley 191 is secured upon one end of the shaft 189.

The second support member 183 has formed on its inner face a vertical dove-tail track 192 receiving in vertically-slidable relationship the mounting plate 193 of a horizontally extending bearing socket 194. A second head or head member 195 has its axial hub 196 rotatably supported in the socket 194 upon suitable bearings 197. A bracket 198 projects inwardly from the support member 183 below the track 192 and receives an adjusting screw 199 rotatably engaging the socket 194 for adjusting the vertical position of the plate 193 in the track 192 and hence, the relative vertical alinement of the head 195 with respect to the head 184. The head 195 is formed with peripheral gear teeth 200 engaging consecutive idler gears 201 and 202, the latter engaging in turn a low tooth count gear 203 mounted on the shaft 189.

A wobbly pin 204 is connected eccentrically to the first head 184 through a universal joint 205 and has its opposite end connected through a universal joint 206 to a pin 207 eccentrically mounted in the second head 195 upon bearings 208.

In the operation of this modification, the reciprocation of the head 184, usually slow speed, is transferred to the second head to result in the rotation of both heads and the delivery of a rotating power output through the shaft 189, usually high or ultra-high speed. The very low friction factors involved make possible this equivalent of driving a speed reducer in a reverse manner.

The vertical adjustability of the second head provides for changing the eccentricity of the second head with respect to the axis of the first head and thereby adjusting the stroke to the reciprocating stroke, the two idler gears being slidably or pivotally mounted to permit such adjustment.

The idler gears may be removed and the head 195 locked, as by the pin 209, so that the head 184 alone drives the shaft 189, or the idler gears may be replaced by a single gear in which case the heads will rotate in opposite directions. The latter variation is adapted to accommodate high speed reciprocations with a slower speed rotational output.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A mechanical thrust transmitting device including a pair of spaced heads mounted for rotation about an approximately common axis, means for rotating each of the heads independently of the other head, a socket member carried in one of the heads, the socket member being carried in rotatable relationship to the latter head, the socket member in the socket member carrying head and the other head having formed therein in facing relationship circular grooves disposed eccentrically with respect to the axis of rotation of said heads, the circular grooves having semi-circular transverse cross-sectional shapes, and a wobbly pin extending between the heads, the wobbly pin having upon each end a circular rib of semi-circular transverse cross-sectional shape, the ribs being disposed in the grooves and being shaped complementary thereto.

2. A mechanical thrust transmitting device as set forth in claim 1 wherein the socket member is disposed eccentrically within the socket member carrying head, and the groove of the socket member is disposed concentrically of the socket member.

References Cited by the Examiner

UNITED STATES PATENTS

| | | | |
|---|---|---|---|
| 2,181,234 | 11/1939 | Hawes | 74—22 |
| 2,278,775 | 4/1942 | Fiorentino | 74—424 X |
| 2,420,984 | 5/1947 | Shepard | 74—22 |
| 2,578,837 | 12/1951 | Raney | 74—22 X |
| 2,583,775 | 1/1952 | Hyde | 74—424 |
| 2,836,985 | 6/1958 | Maroth | 74—424 |
| 2,928,287 | 3/1960 | Chillson | 74—424 X |
| 3,039,676 | 6/1962 | Mikina | 74—22 X |
| 3,154,292 | 10/1964 | Rankin et al. | 254—105 |

FOREIGN PATENTS

| | | |
|---|---|---|
| 800,260 | 7/1936 | France. |
| 475,262 | 11/1937 | Great Britain. |
| 846,766 | 8/1960 | Great Britain. |

BROUGHTON G. DURHAM, *Primary Examiner.*